United States Patent
Holland et al.

(10) Patent No.: US 9,091,800 B2
(45) Date of Patent: Jul. 28, 2015

(54) GLASS BUFFERS

(71) Applicant: OFS Fitel, LLC, Norcross, GA (US)

(72) Inventors: William R Holland, Upper Black Eddy, PA (US); Sean Sullivan, Keansburg, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/206,641

(22) Filed: Mar. 12, 2014

(65) Prior Publication Data

US 2014/0270667 A1     Sep. 18, 2014

Related U.S. Application Data

(60) Provisional application No. 61/787,854, filed on Mar. 15, 2013.

(51) Int. Cl.
*G02B 6/02* (2006.01)
*G02B 6/036* (2006.01)
*C03B 37/012* (2006.01)
*C03C 25/00* (2006.01)

(52) U.S. Cl.
CPC ...... *G02B 6/03627* (2013.01); *C03B 37/01211* (2013.01); *C03B 37/01248* (2013.01); *C03C 25/00* (2013.01)

(58) Field of Classification Search
None
See application file for complete search history.

(56) References Cited

U.S. PATENT DOCUMENTS

2013/0016742 A1 *    1/2013    Sakamoto ................. 372/6

* cited by examiner

*Primary Examiner* — Jerry Rahll
(74) *Attorney, Agent, or Firm* — Sam Han, Esq.

(57) ABSTRACT

The present disclosure is directed to optical fibers having glass buffers. As such, some embodiments comprise an optical fiber having a core, a cladding, and a glass buffer. For some embodiments, the glass buffer has an index of refraction that is greater than the index of refraction of the cladding.

16 Claims, 4 Drawing Sheets

GLASS BUFFERS

CROSS-REFERENCE TO RELATED APPLICATIONS

This application claims the benefit of U.S. Provisional Patent Application Ser. No. 61/787,854, filed on 2013 Mar. 15, having the title "Glass Buffers," which is incorporated by reference in its entirety as if expressly set forth herein.

BACKGROUND

1. Field of Disclosure

The present disclosure relates generally to optics and more particularly to optical fibers.

2. Description of Related Art

Fiber lasers are often used in high-power optical applications. The high power levels employed in these applications can result in elevated temperatures at various points of vulnerability. As a consequence, there are ongoing efforts to mitigate potential overheating within high-power optical systems.

SUMMARY

The present disclosure is directed to optical fibers having glass buffers. As such, some embodiments comprise an optical fiber having a core, a cladding, and a glass buffer. For some embodiments, the glass buffer has an index of refraction that is higher than the index of refraction of the cladding.

BRIEF DESCRIPTION OF THE DRAWINGS

Many aspects of the disclosure can be better understood with reference to the following drawings. The components in the drawing are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
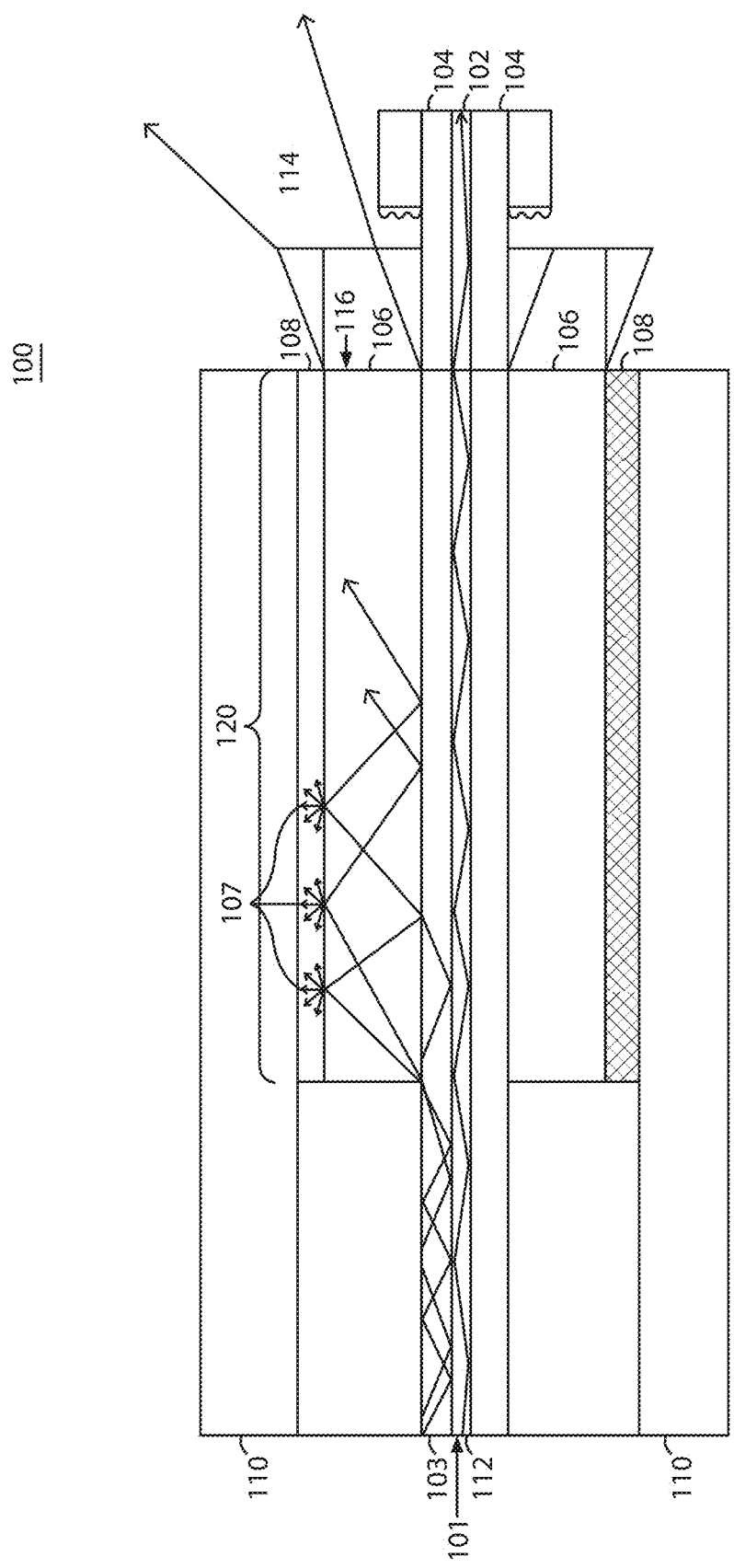
FIG. 1 shows one embodiment of an optical fiber with a glass buffer.

In high-power applications that employ fiber lasers, optical fibers are often spliced together. After a splice, such as after a taper in a tapered fiber bundle (TFB), it is common to find light propagating in the cladding. Whether the optical fiber is a single mode fiber (SMF) or multimode fiber (MMF), it is preferable to remove or strip the light from the cladding. Currently, polymer coatings are used to strip this unwanted light from the cladding. One drawback of using a polymer coating is that, depending on the material, the polymer coating may have an index of refraction that permits light at certain angles to enter the polymer, thus resulting in overheating and consequently causing damage and failure.

Specifically, polymer coatings present two areas of vulnerability. The first area is a bond point immediately after a splice of between a taper and an output fiber. If the splice is not perfectly core-and-cladding matched, then core light may be indirectly injected into the cladding. The indirectly-injected light will be guided along the cladding through total internal reflection (TIR) until it reaches a material having an index of refraction that matches the cladding. That index-matched material is typically the polymer coating.

As light enters the polymer coating, the polymer coating heats, often causing thermal failure and damage. The rate at which the polymer coating heats is often a function of thickness. Thus, in junctions where an edge is stripped, the polymer coating may be thinner resulting in greater temperatures at these edge-stripped junctions. Experiments show that cladding light of approximately 200 to 300 milliwatts (mW) guided into the polymer coating increases the temperature significantly. Thus, as one can imagine, laser combiner applications, which are meant to handle two (2) kilowatts (kW) of power, can result in significant overheating, especially since current specifications call for a combiner efficiency of 95 or greater, which translates to a range of 100 to 200 watts (W) of light potentially being guided within the cladding region.

Conventionally, this excessive heating is controlled by a low index bonding material flowed over the stripped area to heat sink the fiber to an aluminum housing. Additionally, thermal compounds have been used to further heat sink the fiber and scatter residual light within the polymer coating. Unfortunately, such a low-index bonding material adds rigidity to the system and is typically not used to remove cladding light. Thus, most of the light in the cladding propagates beyond the bond point.

The second area of vulnerability is a mode stripper region of an optical fiber where the coating is stripped so that the cladding is exposed. The exposed cladding permits light propagating through the cladding to escape. Typically, after the coating has been stripped, the exposed fiber is placed into an aluminum housing and bonded with a low-index bonding material. A thermal compound is then placed over a length of the bare fiber, which creates a boundary through which light can be scattered. The scattered light can be omnidirectional and, therefore, can be re-injected into the fiber at a different numerical aperture. The initial contact between the cladding and the thermal compound in the mode stripper region presents heating problems that can negatively impact the fiber's performance.

With these overheating issues in mind, the present disclosure teaches a glass buffer to remove the light from the cladding, thereby ameliorating some of overheating issues. Using a glass buffer with an index of refraction that is higher than the cladding results in removal of excess cladding light. Furthermore, due to its thermal characteristics, the glass buffer has a greater heat tolerance than polymer buffers, thereby further mitigating any overheating problems.

Having provided an overview of several embodiments, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Glass Buffer with Thermal Compound Layer

FIG. 1 shows one embodiment of an optical fiber 100 with a silica core 102 surrounded by a cladding 104. A glass buffer 106 is located radially exterior to the cladding 104, and preferably in direct contact with the cladding 104. For some embodiments, the glass buffer 106 is approximately twice the thickness of the cladding 104. For other embodiments, the glass buffer 106 is greater than twice the thickness of the cladding 104. The glass buffer 106 has an index of refraction that is greater than the index of refraction of the cladding 104. In a preferred embodiment, the glass buffer 106 comprises borosilicate, which has a melting point temperature that is between approximately 900 and approximately 1000 degrees Celsius and a refractive index of approximately 1.47.

Due to the thermal characteristics of glass, the glass buffer 106 is capable of withstanding higher temperatures than polymer-based buffers. Additionally, due to the differences in the indices of refraction between the cladding 104 and the glass buffer 106, the glass buffer 106 is capable of stripping out the cladding light. As one can appreciate, the length of the glass buffer will be proportional to the difference in the NA (e.g., shorter length for larger difference in NA, longer length for smaller difference in NA). The glass buffer 106 is also superior to existing technologies because the glass buffer 106 has a lower melting point than that of the optical fiber's silica core 102 and cladding 104. This differential provides for improved fiber performance and more efficient bonding between the glass buffer 106 and the cladding 104.

Continuing with the embodiment of FIG. 1, radially exterior to the glass buffer 106 is a thermal compound layer 108 (e.g., commercially available, low-density T644, which is manufactured by Therm-A-Form™). The addition of this thermal compound layer 108 further improves the thermal characteristics of the optical fiber 100. As shown in FIG. 1, an aluminum housing 110 surrounds the thermal compound layer 108.

In operation, high power core light 101 propagates through the optical fiber's silica core 102. The core light 101 is shown propagating left to right immediately after a taper or output optical splice 112. Core signal light 101 can be injected into the cladding 104 at the splice 112 through total internal reflection (TIR). The cladding light 103 is guided down the length of the cladding 104 until it reaches the glass buffer 106 and, due to the higher index of refraction of the glass buffer 106, the cladding light 103 is refracted into the glass buffer 106, where the light is propagated downstream and eventually ejected from the glass buffer 106 into free space 114. Thus, the glass buffer 106 acts as a quasi-waveguide.

In conventional systems that employ polymer buffers, the refracting of light would have result in an area of elevated heat, leading to possible overheating and subsequent failure. However, unlike conventional systems, the thermal characteristics of the glass buffer 106 make it less susceptible to overheating. The thermal compound layer 108 has a lower index of refraction. Thus, very little (if any) light 107 escapes from the glass buffer 106 into the thermal compound layer 108. To the extent that light escapes from the glass buffer 106, the escaping light creates an area 120 that is susceptible to heating. However, the thermal compound layer 108 further reduces the heat present in the area 120 by providing a heat sink. This heat sink combined with the redirection of through the glass buffer 106, mitigates the risk of fiber damage due to unwanted cladding light 103.

Experimental Verification of Improved Thermal Characteristics of Glass Buffer

The thermal characteristics of the glass buffer confirmed experimentally, where a first MMF (fully-filled, 0.16 numerical aperture (NA), 105-micron core, 125-micron cladding multimode optical fiber) was spliced to a second MMF (50-micron core, 360-micron cladding). The core of the first MMF was centered and aligned with the core of the second MMF as a direct splice. A borosilicate buffer was applied to the 360-micron cladding of the second MMF for a length of about 5 millimeters (5 mm), at a thickness of approximately 2.5 millimeters (mm).

The core sizes were intentionally mismatched to allow injection of core light from the first MMF into the cladding of the second MMF. Twenty-three (23) watts (W) of power was launched into the first MMF. The inner core ratio of 105 microns to 50 microns was approximately 23%, thus resulting in approximately 23% of the light propagating in the 105-micron core of the first MMF being propagated to the 50-micron core of the second MMF, and the remaining light (approximately 77%) being injected into the cladding of the second MMF. That cladding light in the second MMF was then stripped out by the glass buffer. Measurements taken at the end of the length of the mode stripper region of the second MMF indicated that approximately 23% of the total power remained in the core of the second MMF.

Furthermore, to confirm that the glass buffer stripped approximately 77% of the cladding light, the second MMF was cleaved and a reference measurement was taken at the cleavage point. The reference measurement was taken by core-and-cladding-match splicing the second MMF with third MMF (50-micron core, 360-micron cladding) having a coating with a high index of refraction. The reference measurement taken at the cleaved end of the second MMF was equivalent to the power measured at the end of the third MMF. In other words, no differential existed between the cleaved end of the second MMF and the end of the third MMF, thus affirming that all residual cladding light was stripped from the cladding by the glass buffer.

Glass Buffer without Thermal Compound Layer

Figure 2:
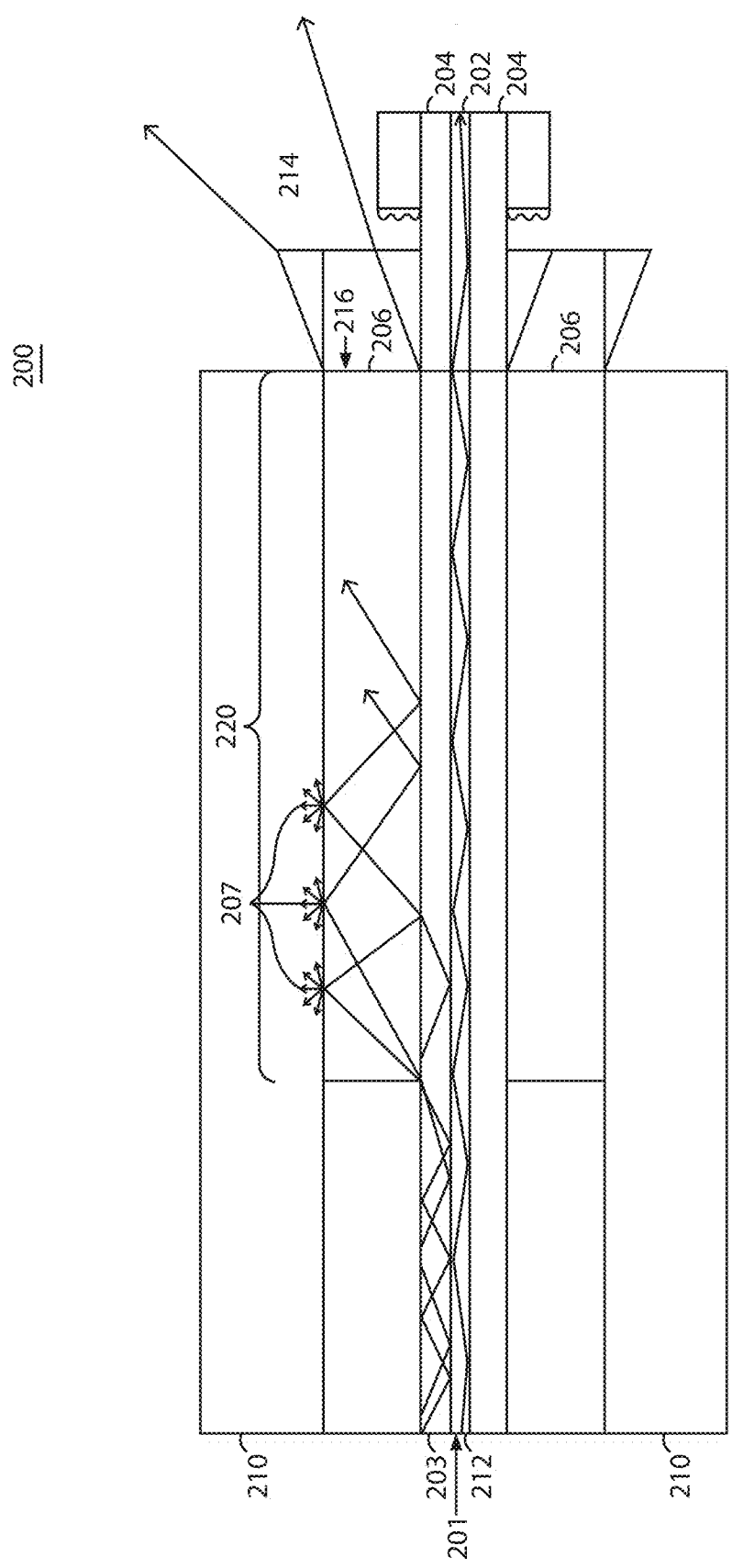
FIG. 2 shows another embodiment of an optical fiber with a glass buffer.

FIG. 2 shows another embodiment of an optical fiber 200 with a silica core 202 surrounded by a cladding 204. A glass buffer 206 is located radially exterior to the cladding 204, again, preferably in direct contact with the cladding 204. The glass buffer 206 has an index of refraction that is greater than the index of refraction of the cladding 204 and, in a preferred embodiment, the glass buffer 206 comprises borosilicate. Radially exterior to the glass buffer 206 is an aluminum housing 210 that surrounds the glass buffer 206.

In operation, core light 201 propagates through the optical fiber's silica core 202 and, also, in the cladding 204 after a splice 212. The cladding light 203 is guided down the length of the cladding 204 until it reaches the glass buffer 206 and, due to the higher index of refraction of the glass buffer 206, the cladding light 203 is refracted into the glass buffer 206, where the light is propagated downstream and eventually ejected from the glass buffer 206 into free space 214.

Similar to the embodiment of FIG. 1, very little (if any) light 207 escapes from the glass buffer 206. To the extent that light escapes from the glass buffer 206, the escaping light creates an area 220 in the aluminum housing 210 that is susceptible to heating. However, the redirection of through the glass buffer 206 mitigates significantly the heating of the aluminum housing 210. Unlike the embodiment of FIG. 1, the embodiment of FIG. 2 does not include a thermal compound layer (108 of FIG. 1). Thus, more light and heat is absorbed into the aluminum housing than would take place with a thermal compound layer. However, the glass buffer 206 still reduces the light and resulting heat significantly over polymer coatings.

Thermal Maps

Figure 3A:
FIGS. 3A and 3B are thermal maps showing areas of heating.
Figure 3B:
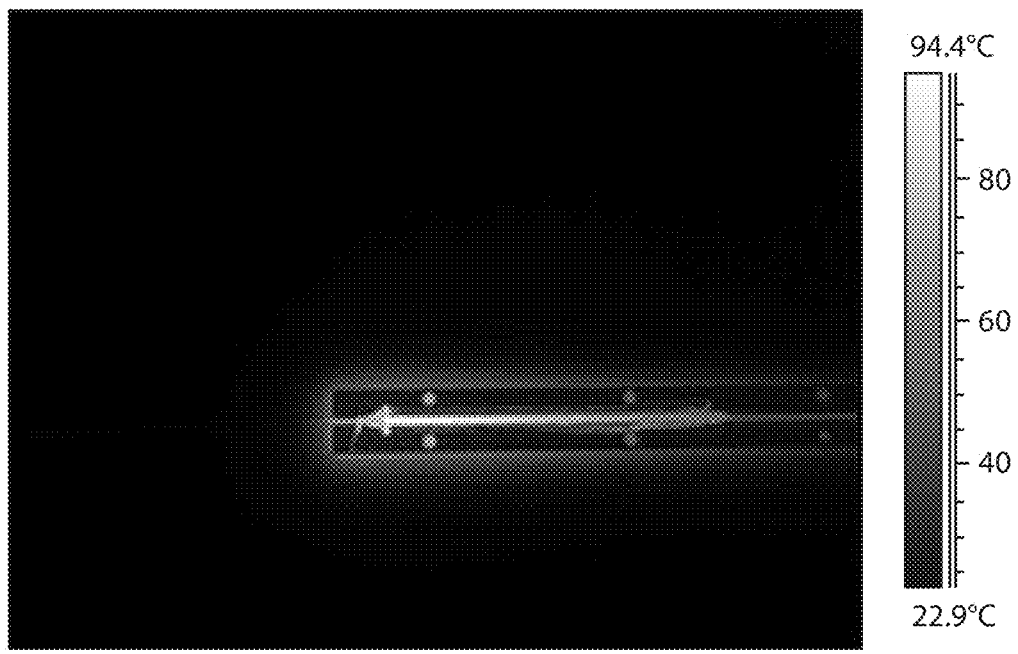

FIGS. 3A and 3B are thermal maps showing how the glass buffer 106 reduces heat accumulation. Specifically, FIG. 3A is a thermal map showing how the optical fiber of FIG. 1 performs. By contrast, FIG. 3B is a thermal map showing areas of heating in a conventional optical fiber with a polymer buffer.

To generate the thermal map of FIG. 3A, two core-mismatched fibers were spliced to each other, and light (propagated from left to right) was injected into the fibers. Approximately 23 Watts (W) of multimode light was injected into the fiber and, due to the intentional core-mismatch, the multimode light propagated into the cladding. The properties of the glass buffer allowed the glass buffer to act as a waveguide, thereby allowing light to escape. Since the melting point of glass is greater than 1000° C., no heat sink was necessary. This configuration resulted in 77% of the light being stripped out, with the device heating up to approximately 63° C., which translated to a thermal coefficient of approximately 3.55° C./W.

The thermal map of FIG. 3B was generated using core-mismatched fibers with traditional polymer buffers and a metal housing that acted as a heat sink. Again, the core mismatch resulted in light being propagated into the cladding. For FIG. 3B, approximately 22 W of multimode light was injected into the fiber, with approximately 65% of that light being stripped out. This configuration resulted in the device heating up to approximately 94° C., which translated to a thermal coefficient of approximately 6.57° C./W (nearly twice that of the glass buffer). In other words, due to the thermal characteristics of the polymer buffer, the light that was stripped out of the fiber was not transmitted and, instead, was converted into heat energy. While the metal housing acted as a heat sink, the configuration of FIG. 3B generated more heat and, eventually, would have smoldered due to the heat.

Thus, as one can see from the examples of FIGS. 3A and 3B, the performance of the glass buffer (FIG. 3A) is superior to the performance of the polymer buffer (FIG. 3B)

Fabrication Process

Figure 4:
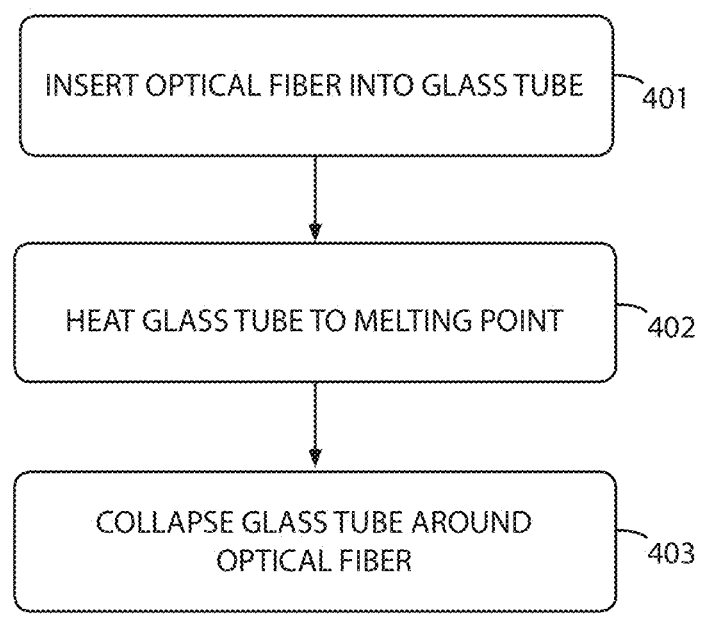
FIG. 4 is a flow chart showing one embodiment of a method for fabricating an optical fiber with a glass buffer.

Having described optical fibers 100, 200 with glass buffers 106, 206, as well as their respective performance characteristics (FIGS. 3A and 3B) attention is turned to FIG. 4, which shows one embodiment of a process for fabricating the optical fibers 100, 200 with glass buffers 106, 206. As shown in the embodiment of FIG. 4, an optical fiber is inserted 401 into an open-ended glass tube, which has a higher index of refraction than the cladding and a lower melting point than the cladding or the core. In one preferred embodiment, the glass tube is comprised of borosilicate. The glass tube and optical fiber are then heated 402 to the melting point of the glass tube. The applied heat causes the glass tube to collapse 403 around the optical fiber to form glass buffer. Because the glass tube has a lower melting point than that of the optical fiber's core or cladding, the collapsing 403 of the glass tube around the fiber creates the glass buffer with no disturbance to the silica core or cladding. Once formed, the glass buffer provides a better interface to the optical fiber than conventional polymer buffers because of the glass buffer's higher index of refraction and superior adhesion qualities.

Although exemplary embodiments have been shown and described, it will be clear to those of ordinary skill in the art that a number of changes, modifications, or alterations to the disclosure as described may be made. For example, while borosilicate is specifically recited in a preferred embodiment, it should be apparent to one having ordinary skill in the art that other materials with the desired lower melting point and higher index of refraction can be used to form the buffer. Also, while T644 (from Therm-A-Form™) is recited in one embodiment, it should be appreciated by those of skill in the art that a different thermal compound with similar characteristics can also be used in alternative embodiments. All such changes, modifications, and alterations should therefore be seen as within the scope of the disclosure.

What is claimed is:

1. An apparatus, comprising:
an optical fiber comprising:
a silica core; and
a cladding located radially exterior to the silica core, the cladding having a first thickness, the cladding having a first index of refraction, the cladding further having a first melting point; and
a glass buffer located radially exterior to the cladding, the glass buffer being in contact with the cladding, the glass buffer having a second thickness, the first thickness being less than the second thickness, the glass buffer having a second melting point, the second melting point being lower than the first melting point, the glass buffer having a second index of refraction, the second index of refraction being higher than the first index of refraction.

2. The apparatus of claim 1, further comprising a thermal compound located radially exterior to the buffer.

3. The apparatus of claim 2, further comprising an metal aluminum housing located radially exterior to the thermal compound.

4. The apparatus of claim 1, the glass buffer comprising borosilicate glass.

5. The apparatus of claim 1, the second melting point being between approximately 900 degrees Celsius and approximately 1000 degrees Celsius.

6. The optical fiber of claim 1, the second index of refraction being approximately 1.47.

7. An apparatus, comprising:
an optical fiber comprising a core and a cladding, the cladding having a first thickness, the cladding having a first index of refraction; and
a glass buffer located radially exterior to the cladding, the glass buffer having a second thickness, the first thickness being less than the second thickness, the glass buffer having a second index of refraction, the second index of refraction being higher than the first index of refraction.

8. The apparatus of claim 7, the glass buffer being in contact with the cladding.

9. The apparatus of claim 7, the cladding having a first melting point, the glass buffer having a second melting point, the second melting point being less than the first melting point.

10. The apparatus of claim 9, the second melting point being between approximately 900 degrees Celsius and approximately 1000 degrees Celsius.

11. The apparatus of claim 7, the glass buffer comprising borosilicate.

12. The apparatus of claim 7, the second index of refraction being approximately 1.47.

13. The apparatus of claim 7, further comprising a metal housing located radially exterior to the glass buffer.

14. The apparatus of claim 13, the metal housing comprising aluminum.

15. The apparatus of claim 13, the optical fiber comprising a thermal compound located between the glass buffer and the metal housing.

16. The apparatus of claim 15, the thermal compound comprising T644.

* * * * *